CONTROL ARRANGEMENT

Filed Aug. 19, 1960

GEORGE L. CLARK
JOHN J. HICKEY
*INVENTORS*

BY

ATTORNEY 3,105,168
Patented Sept. 24, 1963

3,105,168

CONTROL ARRANGEMENT

George L. Clark, Hawthorne, and John J. Hickey, Lawndale, Calif., assignors to Space Technology Laboratories, Inc., Los Angeles, Calif., a corporation of Delaware Filed Aug. 19, 1960, Ser. No. 50,652
3 Claims. (Cl. 315—22)

This invention relates to a control arrangement and more particularly to a wave shaping generator circuit arrangement for generating a precisely controllable waveform having a large and linear voltage excursion and a precisely determined time duration.

There are special applications such as image converter tubes, micro-oscillographs, and traveling wave oscilloscopes which require precisely controllable ramp voltage waveforms in which the voltage changes by thousands of volts in about a microsecond. For instance, waveforms are required in an image converter tube usable as a portion of an ultra fast camera requiring control waveforms which change linearly over a range of up to 3,000 volts or more during periods on the order of one-tenth to ten microseconds. Although Miller integrator type circuits and multivibrator circuits have been known for some time, they are not completely satisfactory for generating such ramp waveforms since these circuits give good linearity only at relatively slow switching rates. This is particularly troublesome in laboratory equipment requiring precise recording of data occuring within a few microseconds. Furthermore, the Miller and the multivibrator type circuits may not be adapted readily to traverse voltages of the magnitude necessary for image converter tubes whereby amplification is necessary. Often it is particularly difficult to amplify such a waveform while preserving the desired linearity.

In accordance with the present invention, a negative voltage ramp having several thousand volts variation and excellent linearity is generated at an anode of a beam power vacuum tube by applying to the grid a waveform which will produce a constant current through the tube. With the anode current constant for a sufficient length of time to form the desired ramp waveform, a previously charged capacitor connected between the anode and ground is discharged at a constant rate and thus produces a linearly falling voltage waveform thereacross. By selecting the particular vacuum tube used from the high power class, such as the transmitting tubes, which can operate at high voltages and can conduct large currents, the desired waveform may be generated at the required voltage directly, thus eliminating the need for the difficult to arrange, extremely linear, high power amplifier circuits.

The subject matter which is regarded as this invention is particularly pointed out and distinctly claimed in the concluding portion of the specification. The invention, however, as to its organization and operation, together with further objects and advantages thereof, will best be understood by reference to the following description taken in connection with the accompanying drawing in which:

Figures 1, 2, 3:
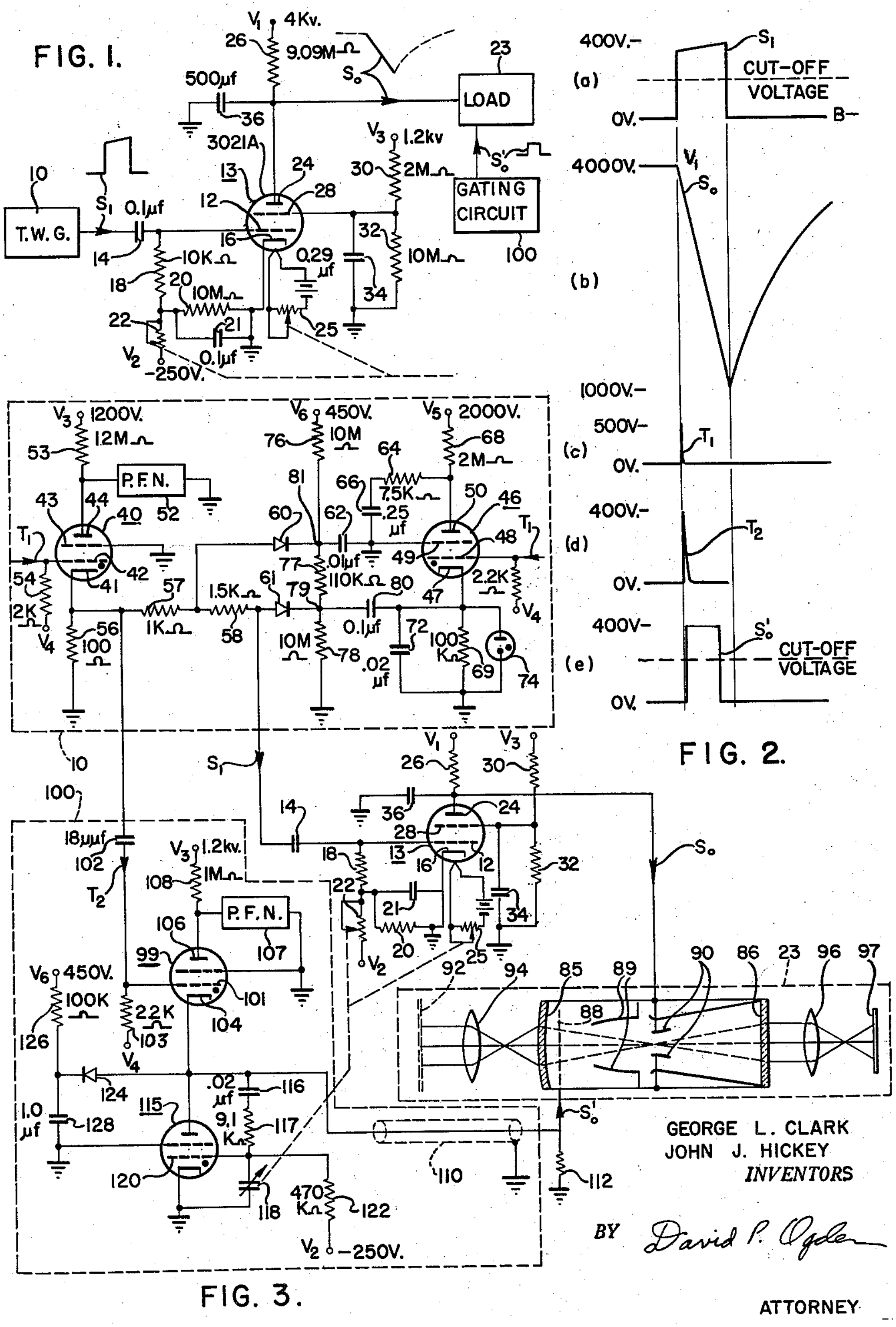
FIG. 1 is a schematic diagram illustrating the present invention.
FIG. 2 illustrates several of the pulse waveform voltages occurring within particular portions of the circuit.
FIG. 3 is a schematic circuit diagram illustrating one embodiment of the present invention.

Referring now to the drawing, wherein like numbers refer to similar parts, there is shown in FIG. 1 a trapezoidal waveform generator 10 which generates a trapezoidal waveform $S_1$ (see FIG. 2*a*) having a time duration of about one microsecond and a maximum voltage magnitude excursion as great as 400 volts. The trapezoidal waveform $S_1$ is applied to a control grid 12 of a beam power tube 13 through a D.C. blocking coupling capacitor 14. Prior to current conduction within the tube 13, the control grid 12 is connected to a bias voltage $V_2$ which is 250 volts negative compared to the cathode 16. A grid return current resistor 18 is connected between the control grid 12 and the bias voltage $V_2$.

A network including a large resistor 20, a parallel bypass capacitor 21, and a variable resistor 22 regulate the effective bias voltage to obtain a control of the current flow through the tube 13 and thus control the rate of fall of an output high voltage sweep waveform $S_0$ (FIG. 2*b*). To obtain a desired high voltage sweep waveform $S_0$, the trapezoidal waveform $S_1$ is applied to the control grid 12 to induce current flow in the tube 13 which becomes conductive. In order to control the characteristics of the tube 13 to provide further control of the rate of fall and necessary linearity of the voltage sweep waveform $S_0$, a variable resistor 25 is connected in the heater circuit. The coordinated and simultaneous operation of the variable resistors 22 and 25 accomplishes rates of sweep voltage fall other than the one necessary to obtain a sweep of the one microsecond time duration mentioned above.

In order to obtain voltage magnitudes of the type required for a sweep voltage effective on a load 23, the anode 24 of the tube 13 is connected to a 4,000 volt positive power supply $V_1$ through a high impedance resistor 26, and the screen grid 28 of the tube 13 is connected to a 1,200 volt power supply $V_3$ through a high impedance resistor 30. A voltage dividing network is established in the circuit of the screen grid 28 by the utilization of a second resistor 32 such that the steady state potential on the screen grid potential is about 1,000 volts. A bypass capacitor 34 is provided to maintain a fixed potential on the screen grid 28 to maintain constant current flow through the tube 13.

At the instant the trapezoidal waveform $S_1$ is applied, the control grid 12 is raised above its cut-off bias voltage $V_2$ (as illustrated in FIG. 2*a*) and current flow is established through the tube 13. Because of the magnitude of the impedance of the resistor 26, essentially all of the current flow is utilized to discharge a wave shaping capacitor 36 connected between the anode 24 and ground. During the non-conductive period of the tube the capacitor 36 has been charged to the 4,000 volt supply voltage applied thereacross. As the capacitor 36 is discharged by current flowing through the tube 13, the potential of the anode 24 is reduced. With reduction of the anode potential the current flow throughout the tube 13 would tend to drop if the grid potential were constant. However, constant current flow through the tube is maintained by the increasing voltage applied to the control grid 12, as may be seen in the trapezoidal waveform $S_1$. This increasing control grid voltage results in a constant current flow through the tube 13, a constant discharging rate of the capacitor 36, and ultimately the linearly decreasing voltage magnitude in the output sweep waveform $S_0$. Several currently available beam power tubes are suitable for such operation in that they may be driven to provide a constant current flow while the plate voltage is falling at a constant rate by providing a simple and precisely linear driving trapezoidal waveform $S_1$ to the control grid. Current characteristics of the EIMAC 4–65A and CBS 3D21, for example, have constant current characteristics which are substantially straight lines over a range of anode voltage of 3,000 volts.

Referring now to FIG. 3 there is shown a more complete circuit diagram illustrating the elements within one type of trapezoidal waveform generator 10 which will generate a precisely controllable waveform. FIG. 3 also illustrates a particular load 23 in the form of an image converter tube adapted to use the sweep voltage waveform defined as $S_0$ in connection with FIG. 1. Moreover, FIG. 3 illustrates other wave shaping circuits necessary to operate the image converter tube load 23.

As shown in FIG. 3, a first thyratron 40 has a cathode 41, an ionizing grid 42, a grounded screen grid 43, and an anode 44. One thyratron suitable for operation in this circuit is commonly known as a 2D21. There is also shown a second similar thyratron 46 having a cathode 47, an ionizing grid 48, a grounded screen grid 49, and an anode 50. As is well known, a gas filled thyratron tube will become conductive when the voltage of the ionizing grid is raised above a certain threshold voltage. Once a thyratron tube is conductive it is necessary to reduce the voltage between the cathode and anode to terminate current flow. Thus variations in the voltage at the ionizing grid will not materially affect the rate of current flow through the ionized thyratron tube.

In order that the thyratron tube 40 will provide a rectangular pulse of superior rise time, it is connected to a pulse forming network 52 such as a delay line or the like. In the particular circuit illustrated, the initial voltage applied to the anode 44 and the pulse forming network 52 is established at 1.2 kilovolts $V_3$ through a high impedance resistor 53 during the period when the tube is nonconductive. The pulse forming network 52 is of the type which, when charged to the voltage of the anode 44, causes a fixed voltage equal to about one-half of the power supply voltage $V_3$ as long as the tube is conductive. The duration of this voltage pulse is dependent upon the arrangement of the pulse forming network 52. At the termination of such a pulse, in a properly impedance matched system, the anode voltage is abruptly reduced to zero and circuit flow ceases. Thus the characteristics of the pulse forming network 52 determine the duration of the trapezoidal waveform $S_1$.

In order to initiate instantaneous ionization of the thyratron tube 40, a sharp rising trigger pulse $T_1$ (FIG. 2*c*) of about 500 volts is applied to the ionizing grid 42 to overcome the cut-off bias voltage $V_4$ applied thereto through a grid resistor 54. The trigger pulse $T_1$ raises the grid voltage substantially above the voltage at the cathode 41 which is connected to ground through a pulse forming network impedance matching cathode load resistor 56.

A rectangular waveform appearing across the cathode load resistor 56 is differentiated and applied to a "gating" thyratron tube 99 as a triggering pulse $T_2$ (FIG. 2*d*). The rectangular waveform is also applied through a pulse shaping circuit including the resistors 57 and 58 to the coupling capacitor 14 in the form of the above mentioned trapezoidal waveform $S_1$. In order to obtain a desired trapezoidal waveform $S_1$, the rectangular waveform is applied to and shaped by the pulse shaping circuit including the diodes 60 and 61 and a reservoir capacitor 62 connected between ground and the diode 60. The diodes 60 and 61 are connected to sense predetermined reference voltages and function to clip the rectangular waveform to obtain the trapezoidal waveform $S_1$.

The final clipping reference voltage sensed by the diode 61 is a ramp waveform developed in the circuit of the thyratron tube 46. In order to obtain the trapezoidal waveform $S_1$, it is preferred that both of the thyratron tubes 40 and 46 are energized initially at the same instant. However, the transient voltage waveform appearing at the cathode 47 during its conductive period is substantially different than that derived from the pulse forming network 52, because of the utilization of a resistor 64 and a capacitor 66, which capacitor is initially charged through a resistor 68 to a voltage $V_5$ of two kilovolts and discharged relatively slowly compared to the abrupt rise and fall of the rectangular waveform during the conductive period of the thyratron tube 46. The voltage developed at the cathode 47 by this RC circuit is in the form of the initial portion of a long exponential voltage waveform of the type normal to RC circuits. The cathode 47 is connected to ground through a resistor 69, a capacitor 72, and a voltage limiting device such as a neon lamp 74. To obtain the desired ramp waveform reference voltage, the voltage source $V_5$ is large and the capacitance of the capacitor 66 is large compared to that of the capacitor 72. Thus the voltage appearing across the capacitor 72 is a linear ramp voltage substantially equal to that appearing across the RC circuit 64—66.

In FIG. 3 there are additional circuit components of the pulse shaping circuit which are requisite to obtaining the desired clipping of the rectangular waveform. These components include a high impedance voltage dividing network consisting of the resistors 76, 77, and 78 connected between ground and a source of voltage $V_6$. The ramp voltage appearing across the capacitor 72 is applied to the voltage dividing network on a voltage tap 79 between the resistors 77 and 78 through a coupling capacitor 80. Thus the voltage appearing across the resistor 78 is modified by the linear ramp voltage to control the final clipping of the waveform presented to the coupling capacitor 14.

In order that the clipping current flow loading of the capacitor 72 can be reduced to a more acceptable range, another clipping circuit is provided in the form of the previously introduced diode 60 and capacitor 62 which are connected to a voltage tap 81 between resistors 76 and 77. This results in an initial clipping of the rectangular waveform at the voltage tap 81. However, because of the utilization of the capacitor 62 this clipping is exponential as a result of charging of the capacitor 62. It should be noted that the reference voltage of the voltage tap 81 applied to the diode 60 is only slightly greater in magnitude than the linear ramp clipping voltage of the voltage tap 79 applied to the diode 61 so that the clipping current flow through the diode 61 is minimized.

The particular load 23 illustrated in FIG. 3 is an image converter tube operable as a light amplifying shutter for pictorial recording of a high speed transient phenomena of the type encountered in experimental plasma physics. The image converter tube 23 has a photoemissive cathode 85 at one end and a fluorescent screen 86 at the other end. Intermediate the photoemissive cathode 85 and the fluorescent screen 86 are means for interrupting the flow of electrons toward the screen 86 in the form of a gating grid 88, an electron lens or focusing electrode arrangement 89, and a pair of electrostatic deflection plates 90. During operation of the image converter tube 23 as a shutter for a camera, light rays from an object 92 are focused by a lens 94 on the surface of the photoemissive cathode 85 to form an image. This image is transformed by the photoemissive cathode into an electron beam which is focused electron optically by the focusing electrode arrangement 89 on the fluorescent screen 86. The resulting luminescence of the fluorescent screen 86 is focused by a lens 96 on a film 97.

The pair of deflection plates 90 is positioned at the cross-over point of the electrons so that the image may be moved from one side to the other of the fluorescent screen 86. Normally, the gating or control grid 88 is biased relative to the cathode 85 to prevent electron flow toward the flourescent screen 86 and exposure is made by applying a positive gating waveform $S_0'$ (FIG. 2*e*) to the gating grid 88 for time durations consistent with the time duration of the image 92 of interest. The time duration of the gating waveform is of the order of millimicroseconds or microseconds. During the application of the gating waveform an image is produced on the fluorescent screen 86 with increased brightness due to the amplifying properties of the image converter tube 23. The increased brightness resulting from such amplification facilitates a clear photographic record of the data of interest.

FIG. 3 also illustrates a gate waveform generating circuit 100 which provides a gating waveform $S_0'$ to the gating grid 88 during the desired periods of time to obtain photographic data. The particular arrangement illustrated herein is selected to utilize the high voltage sweep waveform $S_0$ and thus obtain a streak picture of phenomena occurring during time durations as great as ten microseconds.

It is requisite to apply substantial sweep voltage between the pair of deflection plates 90 to obtain desired deflection of the high velocity electrons. Reduction of the velocity of the electrons traversing the image converter tube is not feasible in attempts to obtain a high resolution picture of transient events occurring within periods on the order of tens of microseconds or less. The obtaining of most valuable data requires a precisely predetermined linear sweep voltage waveform $S_0$ so that the interrelation of phenomena during one portion of a microsecond and another portion of that microsecond may be precisely determined.

In order that the timing of the initiation of conductance through the gating thyratron tube 99 may be conducive to provide the gating waveform $S_0'$ to correspond in time with the sweep waveform $S_0$, the rectangular waveform is differentiated by a coupling capacitor 102 in conjunction with a resistor 103 and applied to an ionizing grid 101. The leading edge of the resulting trigger pulse $T_2$ when applied to the ionizing grid 101 will cause the thyratron tube 99 to ionize, whereby current flow passes from a cathode 104 through an anode 106 to a second pulse forming network 107. Prior to receipt of the trigger pulse $T_2$, the voltage across the pulse forming network 107 is established at 1200 volts by the coupling thereof through an anode resistor 108 to the positive power supply $V_3$. A suitable pulse forming network is provided in the form of a delay line whereby abrupt initiation of current flow through the thyratron tube will cause a wave front to traverse the delay line and thus establish a preselected fixed voltage during the period of conductance of the thyratron tube 40. Because of the criticality of the voltage necessary to obtain a good focus it is preferred that the gating waveform $S_0'$ be applied to the gating grid 88 through a constant impedance device such as a coaxial cable 110 which is properly terminated 112 to avoid reflections.

Termination of the gating waveform $S_0'$ is accomplished by a grounding cathode circuit which shunts the signal after a preselected time delay. As shown in FIG. 3, the firing of an additional thyratron tube 115 reduces the voltage of the gating waveform applied to the grid 88 to zero volts. The delay in firing of the thyratron tube 115 is accomplished by an RC circuit including a coupling capacitor 116, a resistor 117, and a variable capacitor 118. It may be expected that the magnitude of voltage appearing at the cathode 104 would be on the order of 400 volts. In such a circuit arrangement an ionizing grid 120 of the thyratron tube 115 is biased to a negative 250 volts by connection to the bias voltage supply $V_2$ through a resistor 122. Regulation of the time duration of the gating waveform $S_0'$ is obtained by variation of the capacitor 118. At the same time the duration of the gating waveform $S_0'$ is charged, it is necessary to charge the sweep waveform $S_0$ by varying the impedance of the resistors 22 and 25.

Limiting of the voltage appearing at the cathode 104 to a value consistent with the requirements of the image converter tube 23 is obtained by the connection of a diode 124 between the cathode 104 and a reservoir capacitor 128 which has been charged to a 450 volt positive voltage $V_6$ through a resistor 126.

It should be noted that the photoemissive cathode 85 is maintained 150 volts positive relative to the grounded portions of the gating waveform generating circuit 100, whereby in the absence of the gating waveform $S_0'$ the image converter tube 23 is cut off. Also, a sharply focusable electron image is obtainable most easily when the voltages applied to the elements of the image converter tube 23 are carefully regulated. These phenomena and other phenomena relating to the image converter tube itself are known in the art of image converter tubes and need not be explained in detail herein.

In summary, the sweep waveform $S_0$ is applied to one of the deflection plates 90 (the other being grounded) in response to the phenomena occurring in the trapezoidal waveform generator circuit 10 as a result of receipt of the triggering pulse $T_1$ which is preferably coordinated with phenomena occurring at the object 92. At the same instant the trapezoidal waveform $S_1$ is presented to the sweep waveform generator, the trigger pulse $T_2$ is applied to the gate waveform generating circuit 100 to develop simultaneously the gating waveform $S_0'$. When the gating waveform $S_0'$ is applied to the image converter tube 23 it becomes conductive during the initial portion of the sweep voltage and the electron image is swept across the fluorescent screen 86. With this type of coordination between the various signals, the obtaining of a desired triggering signal is reliably reproducible. It is also feasible to apply the triggering pulse $T_1$ to the gate waveform generating circuit 100 to initiate the gating waveform $S_0'$ at precisely the same instant as the initiation of the sweep waveform $S_0$. When it is desired to obtain streak photographs of events occurring in less than a microsecond, such a connection is desirable.

What is claimed is:

1. A voltage control arrangement for an image converter tube device having a gating grid and deflection plates, comprising: a multi-element grid controlled high power vacuum tube; a capacitor connected between an anode of said tube and ground to be charged to the voltage appearing at the anode; means for charging said capacitor during a non-conductive period of said tube; a control grid normally biased to a voltage preventing current flow through said tube; a waveform generator for generating a rectangular waveform; circuit means receptive of said rectangular waveform for generating a trapezoidal waveform having a simultaneous time duration; means for coupling said trapezoidal waveform to said control grid, said trapezoidal waveform having a sharply rising wavefront to initiate current flow through said high power vacuum tube by overcoming said bias, whereby said capacitor will be discharged at a rate dependent upon the current flow through said tube; said trapezoidal waveform also having a linearly increasing voltage magnitude to reduce the impedance of said tube during conduction thereof as a function of the discharging of said capacitor for maintaining a constant current flow through said tube during discharge of said capacitor, thereby providing at said anode a linearly decreasing output sweep voltage having a voltage variation on the order of 3,000 volts; circuit means coupling said output sweep voltage to the deflection plates of the image converter device; framing circuit means including voltage stabilizing means for generating a rectangular gating waveform of a predetermined amplitude and time duration, said framing circuit means being triggered by the initial potential of said rectangular waveform to operate during a substantial portion of the time duration of said output sweep voltage; and impedance matching means for coupling said rectangular gating waveform to the gating grid of the image converter device to enhance conductance of a focusable electron image during receipt of said output sweep voltage by the image converter device.

2. A voltage control arrangement for an image converter device having a normally biased to cut-off gating grid and a pair of deflection plates, comprising: a grid controlled high power vacuum tube; a high current capacity capacitor connected between an anode of said tube and ground to be charged to the voltage appearing at the anode; means for charging said capacitor to a voltage on the order of 4,000 volts during a non-conductive period of said tube; a control grid of said tube normally biased to a voltage preventing current flow therethrough; a waveform generator for generating a first rectangular waveform having substantially instantaneous rise and fall a precise time duration apart, said time duration being of the order of one microsecond; clipping circuit means receptive of said first rectangular waveform for controlling precisely the magnitude variation thereof to provide a trapezoidal waveform having a time duration identical with that of said rectangular waveform; first coupling circuit means for applying said trapezoidal waveform to said control grid, said trapezoidal waveform having a sharply rising wavefront to overcome said bias and thus enhance current flow through said tube during said time duration, whereby said capacitor will be discharged at a rate dependent upon the current flow through said tube; said trapezoidal waveform also having a linearly increasing voltage magnitude to reduce the impedance of said tube as a function of the discharging of said capacitor for maintaining a constant current flow through said tube during discharge of said capacitor, thereby providing at said anode a linearly decreasing output sweep voltage having a voltage variation on the order of 3,000 volts during said time duration; second coupling circuit means for applying said output sweep voltage to the pair of deflection plates of the image converter device; framing circuit means including a thyratron tube having voltage stabilizing means in circuit with a cathode thereof for generating a gating waveform of a precisely predetermined amplitude and time duration; second coupling means for applying an initial potential of said first rectangular waveform to an ionizing grid of the thyratron tube to initiate conduction therethrough during at least a portion of said time duration of said output sweep voltage; shunting circuit means in the cathode circuit of said framing circuit thyratron tube for reducing said gating waveform to a value insufficient to overcome the normal bias cut-off of the gating grid; timing means for energizing said shunting circuit means a predetermined time after energization of said thyratron tube to limit the time duration of said gating waveform consistent with the time duration of said output sweep voltage; and impedance matching means for applying said gating waveform to the gating grid of the image converter device to enhance conductance of the focusable electron flow during receipt of said output sweep voltage.

3. A voltage control arrangement for an image converter device having a normally biased to cut off gating grid and a pair of deflection plates, comprising: a grid controlled beam power tube having a cathode and an anode; a high current capacity capacitor connected between the anode and ground to be charged to the voltage appearing at the anode; means for charging said capacitor to a voltage on the order of 4,000 volts during a nonconductive period of said tube; a control grid of said tube normally biased to a voltage preventing current flow therethrough; means for regulating the bias of said control grid; means for regulating the temperature of the cathode, said bias regulating means and said temperature regulating means being coordinated to regulate the impedance characteristic of said tube to obtain a predeterminable rate of discharge of said capacitor; a first rectangular waveform generator for generating a rectangular waveform having a substantially instantaneous rise and fall a precise time duration apart, said time duration being of the order of one microsecond; clipping circuit means receptive of said first rectangular waveform for controlling precisely the magnitude variation thereof to provide a trapezoidal waveform having a time duration identical with that of said rectangular waveform; first coupling circuit means for applying said trapezoidal waveform to said control grid, said trapezoidal waveform having a sharply rising wavefront to enhance current flow through said tube during said time duration, whereby said capacitor will be discharged at a rate dependent upon the current flow through said tube; said trapezoidal waveform also having a linearly increasing voltage magnitude to reduce the impedance of said tube as a function of the discharging of said capacitor for maintaining a constant current flow through said tube during discharge of said capacitor, thereby providing at said anode a linearly decreasing output sweep voltage having a voltage variation on the order of 3,000 volts during said time duration; second coupling circuit means for applying said output sweep voltage to the pair of deflection plates of the image converter device; and means for energizing the gating grid during said time duration with a voltage sufficient to overcome the bias thereon and to permit transmission of an electron image through said gating grid during the duration of said sweep voltage.

References Cited in the file of this patent

UNITED STATES PATENTS

| | | |
|---|---|---|
| 2,059,219 | Farnsworth et al. | Nov. 3, 1936 |
| 2,074,495 | Vance | Mar. 23, 1937 |
| 2,501,857 | Stewart | Mar. 28, 1950 |
| 2,533,251 | Hill | Dec. 12, 1950 |